(12) United States Patent
DuMouchel et al.

(10) Patent No.: US 6,539,391 B1
(45) Date of Patent: Mar. 25, 2003

(54) METHOD AND SYSTEM FOR SQUASHING A LARGE DATA SET

(75) Inventors: William H. DuMouchel, Chatham, NJ (US); Christopher T. Volinsky, Morris Plains, NJ (US); Theodore J. Johnson, New York, NY (US); Corinna Cortes, New York, NY (US); Daryl Pregibon, Summit, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/373,823

(22) Filed: Aug. 13, 1999

(51) Int. Cl.[7] ............................................. G06F 17/30
(52) U.S. Cl. ...................... 707/101; 707/100; 707/102; 707/103; 707/2
(58) Field of Search .................... 707/1–10, 100–104.1, 707/200–209; 706/45–50

(56) References Cited

U.S. PATENT DOCUMENTS

| | | | | |
|---|---|---|---|---|
| 4,482,971 A | * | 11/1984 | Blazek | 382/135 |
| 4,918,643 A | * | 4/1990 | Wong | 703/4 |
| 5,408,638 A | * | 4/1995 | Sagawa et al. | 706/20 |
| 6,012,058 A | * | 1/2000 | Fayyad et al. | 707/6 |
| 6,115,708 A | * | 9/2000 | Fayyad et al. | 707/6 |
| 6,192,360 B1 | * | 2/2001 | Dumais et al. | 707/6 |
| 6,260,036 B1 | * | 7/2001 | Almasi et al. | 707/2 |

OTHER PUBLICATIONS

William DuMouchel, Data squashing: constructing summary data sets, dumouchel@research.att.com, Apr. 2000, pp 1–12.*

Art Owen, Data squashing by empirical likelihood, Stanford University, Sep. 1999, pp 1–18.*

Barbara, D. (1997). The New Jersey Data Reduction Report. *Bulletin on the Technical Committee on Data Engineering* 20(4), pp. 3–45, Dec. 1997, vol 20, No. 4.

Bradley, P.S., U. Fayyad, and C. Reina (1998). Scaling Clustering Algorithms to Large Databases. In *Proc. 4th Intl. Conf. on Knowledge Discovery and Data Mining (KDD)*, pp. 9–15.

DuMouchel, W. (1999). Bayesian Data Mining in Large Frequency Tables, With an Application to the FDA Spontaneous Reporting System. *The American Statistician*, Aug., 1999, vol. 53, No. 3, pp. 177–190.

Johnson, T. and T. Dasu (1998). Comparing Massive High Dimensional Data Sets. In *Proc. 4th Intl. Conf. on Knowledge Discovery and Data Mining (KDD)*, pp. 229–233.

Zhang, T., R. Ramakrishnan, and M. Livny (1997). Birch: A New Data Clustering Algorithm and Its Applications. *Data Mining and Knowledge Discovery* 1(2), pp. 141–181.

\* cited by examiner

*Primary Examiner*—Srirama Channavajjala

(57) ABSTRACT

Apparatus and method for summarizing an original large data set with a representative data set. The data elements in both the original data set and the representative data set have the same variables, but there are significantly fewer data elements in the representative data set. Each data element in the representative data set has an associated weight, representing the degree of compression. There are three steps for constructing the representative data set. First, the original data elements are partitioned into separate bins. Second, moments of the data elements partitioned in each bin are calculated. Finally, the representative data set is generated by finding data elements and associated weights having substantially the same moments as the original data set.

32 Claims, 4 Drawing Sheets

| $A_1$ | $A_2$ | $A_3$ | $\cdots$ | $A_C$ | $X_1$ | $X_2$ | $X_3$ | $\cdots$ | $X_Q$ |
|---|---|---|---|---|---|---|---|---|---|
| $A_{11}$ | $A_{12}$ | $A_{13}$ | $\cdots$ | $A_{1C}$ | $X_{11}$ | $X_{12}$ | $X_{13}$ | $\cdots$ | $X_{1Q}$ |
| $A_{21}$ | $A_{22}$ | $A_{23}$ | $\cdots$ | $A_{2C}$ | $X_{21}$ | $X_{22}$ | $X_{23}$ | $\cdots$ | $X_{2Q}$ |
| $A_{31}$ | $A_{32}$ | $A_{33}$ | $\cdots$ | $A_{3C}$ | $X_{31}$ | $X_{32}$ | $X_{33}$ | $\cdots$ | $X_{3Q}$ |
| $\vdots$ | $\vdots$ | $\vdots$ | | $\vdots$ | $\vdots$ | $\vdots$ | $\vdots$ | | $\vdots$ |
| $A_{N1}$ | $A_{N2}$ | $A_{N3}$ | $\cdots$ | $A_{NC}$ | $X_{N1}$ | $X_{N2}$ | $X_{N3}$ | $\cdots$ | $X_{NQ}$ |

FIG. 3

| $B_1$ | $B_2$ | $B_3$ | $\cdots$ | $B_C$ | $Y_1$ | $Y_2$ | $Y_3$ | $\cdots$ | $Y_Q$ |
|---|---|---|---|---|---|---|---|---|---|
| $B_{11}$ | $B_{12}$ | $B_{13}$ | $\cdots$ | $B_{1C}$ | $Y_{11}$ | $Y_{12}$ | $Y_{13}$ | $\cdots$ | $Y_{1Q}$ |
| $B_{21}$ | $B_{22}$ | $B_{23}$ | $\cdots$ | $B_{2C}$ | $Y_{21}$ | $Y_{22}$ | $Y_{23}$ | $\cdots$ | $Y_{2Q}$ |
| $B_{31}$ | $B_{32}$ | $B_{33}$ | $\cdots$ | $B_{3C}$ | $Y_{31}$ | $Y_{32}$ | $Y_{33}$ | $\cdots$ | $Y_{3Q}$ |
| $\vdots$ | $\vdots$ | $\vdots$ | | $\vdots$ | $\vdots$ | $\vdots$ | $\vdots$ | | $\vdots$ |
| $B_{M1}$ | $B_{M2}$ | $B_{M3}$ | $\cdots$ | $B_{MC}$ | $Y_{M1}$ | $Y_{M2}$ | $Y_{M3}$ | $\cdots$ | $Y_{MQ}$ |

FIG. 4

| | $A_1$ | $A_2$ | $A_3$ | $\cdots$ | $A_C$ | $X_1$ | $X_2$ | $X_3$ | $\cdots$ | $X_Q$ |
|---|---|---|---|---|---|---|---|---|---|---|
| | $A_{11}$ | $A_{12}$ | $A_{13}$ | $\cdots$ | $A_{1C}$ | $X_{11}$ | $X_{12}$ | $X_{13}$ | $\cdots$ | $X_{1Q}$ |
| bin 1 | $\vdots$ | $\vdots$ | $\vdots$ | | $\vdots$ | $\vdots$ | $\vdots$ | $\vdots$ | | $\vdots$ |
| | $A_{a1}$ | $A_{a2}$ | $A_{a3}$ | $\cdots$ | $A_{aC}$ | $X_{a1}$ | $X_{a2}$ | $X_{a3}$ | $\cdots$ | $X_{aQ}$ |
| | $A_{b1}$ | $A_{b2}$ | $A_{b3}$ | $\cdots$ | $A_{bC}$ | $X_{b1}$ | $X_{b2}$ | $X_{b3}$ | $\cdots$ | $X_{bQ}$ |
| bin 2 | $\vdots$ | $\vdots$ | $\vdots$ | | $\vdots$ | $\vdots$ | $\vdots$ | $\vdots$ | | $\vdots$ |
| | $A_{c1}$ | $A_{c2}$ | $A_{c3}$ | $\cdots$ | $A_{cC}$ | $X_{c1}$ | $X_{c2}$ | $X_{c3}$ | $\cdots$ | $X_{cQ}$ |
| | $A_{d1}$ | $A_{d2}$ | $A_{d3}$ | $\cdots$ | $A_{dC}$ | $X_{d1}$ | $X_{d2}$ | $X_{d3}$ | $\cdots$ | $X_{dQ}$ |
| bin 3 | $\vdots$ | $\vdots$ | $\vdots$ | | $\vdots$ | $\vdots$ | $\vdots$ | $\vdots$ | | $\vdots$ |
| | $A_{e1}$ | $A_{e2}$ | $A_{e3}$ | $\cdots$ | $A_{eC}$ | $X_{e1}$ | $X_{e2}$ | $X_{e3}$ | $\cdots$ | $X_{eQ}$ |
| | $A_{f1}$ | $A_{f2}$ | $A_{f3}$ | $\cdots$ | $A_{fC}$ | $X_{f1}$ | $X_{f2}$ | $X_{f3}$ | $\cdots$ | $X_{fQ}$ |
| bin 4 | $\vdots$ | $\vdots$ | $\vdots$ | | $\vdots$ | $\vdots$ | $\vdots$ | $\vdots$ | | $\vdots$ |
| | $A_{N1}$ | $A_{N2}$ | $A_{N3}$ | $\cdots$ | $A_{NC}$ | $X_{N1}$ | $X_{N2}$ | $X_{N3}$ | $\cdots$ | $X_{NQ}$ |

FIG. 5

|       | $A_1$           | $A_2$           | $X_1$    | $X_2$    | $X_3$    | $\cdots$ | $X_Q$    |
|-------|-----------------|-----------------|----------|----------|----------|----------|----------|
| Bin 1 | $A_{i1} = 0$    | $A_{i2} = 0$    | $X_{i1}$ | $X_{i2}$ | $X_{i3}$ | $\cdots$ | $X_{iQ}$ |
| Bin 2 | $A_{i1} = 0$    | $A_{i2} = 1$    | $X_{i1}$ | $X_{i2}$ | $X_{i3}$ | $\cdots$ | $X_{iQ}$ |
| Bin 3 | $A_{i1} = 0$    | $A_{i2} = 2$    | $X_{i1}$ | $X_{i2}$ | $X_{i3}$ | $\cdots$ | $X_{iQ}$ |
| Bin 4 | $A_{i1} = 1$    | $A_{i2} = 0$    | $X_{i1}$ | $X_{i2}$ | $X_{i3}$ | $\cdots$ | $X_{iQ}$ |
| $\vdots$ | $\vdots$     | $\vdots$        | $\vdots$ | $\vdots$ | $\vdots$ |          | $\vdots$ |
| Bin 9 | $A_{i1} = 2$    | $A_{i2} = 2$    | $X_{i1}$ | $X_{i2}$ | $X_{i3}$ | $\cdots$ | $X_{iQ}$ |

FIG. 6

|          | $A_1$        | $A_2$        | $X_1$          | $X_2$          | $X_3$          |
|----------|--------------|--------------|----------------|----------------|----------------|
| bin 2-1  | $A_{i1} = 0$ | $A_{i2} = 1$ | $X_{i1} = r_1$ | $X_{i2} = r_1$ | $X_{i3} = r_1$ |
| bin 2-2  | $A_{i1} = 0$ | $A_{i2} = 1$ | $X_{i1} = r_1$ | $X_{i2} = r_1$ | $X_{i3} = r_2$ |
| bin 2-3  | $A_{i1} = 0$ | $A_{i2} = 1$ | $X_{i1} = r_1$ | $X_{i2} = r_1$ | $X_{i3} = r_3$ |
| bin 2-4  | $A_{i1} = 0$ | $A_{i2} = 1$ | $X_{i1} = r_1$ | $X_{i2} = r_2$ | $X_{i3} = r_1$ |
| bin 2-5  | $A_{i1} = 0$ | $A_{i2} = 1$ | $X_{i1} = r_1$ | $X_{i2} = r_2$ | $X_{i3} = r_2$ |
| $\vdots$ | $\vdots$     | $\vdots$     | $\vdots$       | $\vdots$       | $\vdots$       |
| bin 2-27 | $A_{i1} = 0$ | $A_{i2} = 1$ | $X_{i1} = r_3$ | $X_{i2} = r_3$ | $X_{i3} = r_3$ |

METHOD AND SYSTEM FOR SQUASHING A LARGE DATA SET

BACKGROUND

The present invention relates to databases, and more specifically to summarizing a large data set.

Data mining attempts to find patterns and relationships among data in a large data set and predict future results based on the patterns and relationships by searching for and fitting a statistical model to the data set. One of the chief obstacles to effective data mining is the clumsiness of managing and analyzing a very large data set. The process of model searching and model fitting often requires many passes over the data. However, fitting large data sets into physical memory may be infeasible.

One approach to the problem is constructing summaries of the large data set on which to base the desired analysis. However, devising general-purpose summaries is difficult. For a particular model, such as a set of multiple regression analyses, statistical theory often suggests sufficient statistics that can be computed in a single pass over a large data file without holding the file in memory. However, the appropriate summaries or statistics depend on having the desired model fixed in advance. The problem is that constructing summaries for permitting effective data mining depends on the desired model, whereas selecting a well-fitting model first requires data mining.

A second approach to the problem is drawing a random sample of the large data set on which to base the analysis. Drawing a random sample of the large data set is easy to achieve. Analyzing the sample may take advantage of any statistical method, unrestricted by a possibly unfortunate choice of summary statistics. The biggest disadvantage of random sampling, however, is that sampling variance introduces inaccuracy.

SUMMARY

An aspect of the present invention features techniques for representing a large data file with a condensed summary having the same format as the large data file.

In general, in a first aspect, the invention features a method for summarizing an original large data set with a representative data set. First, a first set of characteristic values describing relationships between a plurality of variables of original data elements is determined. Second, for each of the first set of characteristic values, a statistical representation over the set of original data elements is determined. The statistical representation may be an average value, a weighted average value having more weight assigned to more important or more accurate data elements, a sum of values, or moments of the data set. The statistical representation may be updated when new data elements are received. Finally, the set of representative data elements is generated so that the statistical representation of each of a second set of characteristic values over the set of representative data elements is substantially similar to the statistical representation corresponding to each of the first set of characteristic values. The second set of characteristic values describe relationships between a plurality of variables of representative data elements, similar to the first set of characteristic values. The representative data set may be generated by correlating a Taylor series approximation of the set of original data elements to a Taylor series approximation of the set of representative data elements, using a Newton-Raphson iterative scheme.

Some data sets are very large. Consequently, the invention additionally features a method for assigning original data elements to groups prior to determining the statistical representation. Original data elements having a common characteristic may be assigned to the same group, such as a common value of one or more categorical variables. The common characteristic could additionally or alternatively include a common range of values of one or more quantitative variables. The common characteristic could additionally or alternatively include the value of a statistical characteristic of a plurality of quantitative variables. In such case, the quantitative variables may need to be standardized. One method is to subtract the mean value from each variable and divide by the standard deviation. The statistical characteristic could then include a range of distances from the origin to the standardized point, and/or the value of a standardized variable relative to the values of the remaining standardized variables.

In general, in a second aspect, the invention features a method including assigning original data elements to a group, determining moments of the data elements assigned to a group, and generating representative weighted data elements having substantially similar moments as the moments of the original data elements.

In general, in a third aspect, the invention features a computer program product, including a storage device containing computer readable program code. The program code may include code for performing the above-mentioned methods.

In general, in a fourth aspect, the invention features a data structure having representative data elements. Each representative data element has a plurality of quantitative variables and an associated weight variable. The quantitative variables and the weight variable are combinable as representative weighted moments. The weighted moments are substantially similar to moments of a plurality of original data elements. There are fewer representative data elements than original data elements. The sum of the weight variables of every representative data element represents the number of original data elements.

In general, in a fifth aspect, the invention features a data processing system having a memory for storing statistical information about a set of original data elements, each original data element having a plurality of variables. The system also includes an application program for generating a data structure having a plurality of representative data elements. The representative data elements have the same variables as the original data elements, with the addition of a weight variable. Statistical information about the weighted representative data elements is substantially similar to the statistical information about the set of original data elements. There are fewer representative data elements than original data elements. The statistical information may include moments of varying order.

DESCRIPTION OF THE DRAWINGS

FIG. 3 is a representation of a squashed data set;

FIG. 4 is a representation of an intermediate partitioned data set;

FIG. 5 illustrates Categorical partitioning of a data set having two categorical variables and Q quantitative variables; and FIG. 6 illustrates Hyper-Rectangles partitioning of a categorical partition of a data set having two categorical variables and three quantitative variables.

DESCRIPTION

I. Overview

A feature of data mining distinguishing it from "classical" machine learning and statistical modeling is scale. "Data squashing" addresses scale in a novel fashion by attempting to combine the best features of a pre-processed data summary and random sampling. Rather than scaling up individual machine learning and statistical modeling methods, data squashing scales down a data set. Data squashing effectively summarizes a large data set with a smaller version (often by several orders of magnitude) having the same variables as the original data set. The procedure constructs a squashed data set emulating the multivariate distribution of the larger data set more accurately than random sampling. Each element of the squashed data set has a weight, and the sum of the weights equals the number of elements in the original data set. A weighted analysis of the squashed data set using a Taylor series approximation to the likelihood function provides accurate approximations to the results that would be found from fitting almost any smooth model to the larger data set.

The data squashing methodology applies most directly to flat (row by column) data sets. However, the methodology is extendable to other representations. For purposes of description, an embodiment assumes that a large data set has a simple "flat" structure, consisting of a very large number of data elements, each having a fixed number of variables. Each row of the data set represents an individual data element, and each column of the data set represents one of the variables. The variables are either categorical or quantitative. A categorical variable represents a finite number of permissible states, generally describing a quality rather than a quantity. Examples of categorical variables include gender (male or female), or marital status (single, married, separated, divorced, or widowed). A quantitative variable represents a quantity within a range of permissible values, such as age, income or customer billing average.

Figures 1, 2:
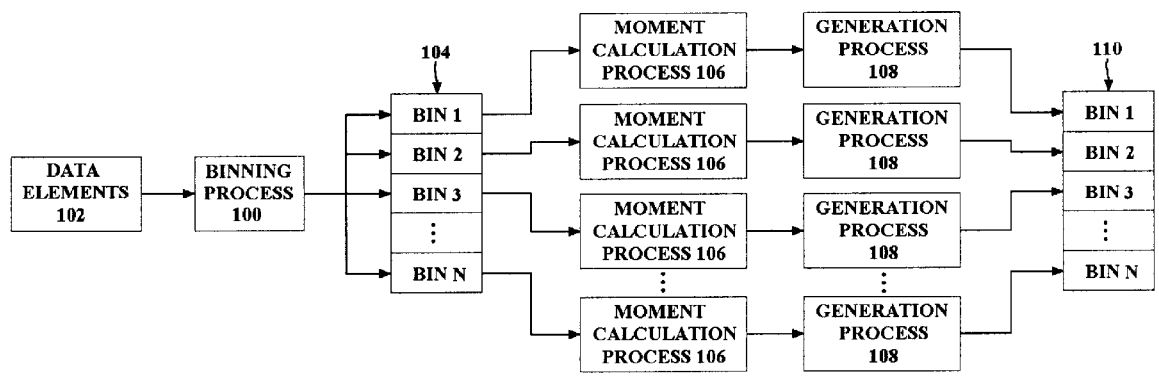
FIG. 1 is a block diagram of a data squashing technique.
FIG. 2 is a representation of an original large data set.

Referring to FIG. 1, the data squashing procedure consists of three sequential steps. First, binning process 100 groups each of the set of data elements 102 into mutually exclusive bins 104. Categorical variables naturally induce bins, one for each possible combination of the permissible states of the categorical variables. Binning process 100 may artificially create additional bins from the quantitative variables, for example from either the quartiles of the single variables or from the use of Data-Spheres, as described in section III. Second, moment calculation process 106 calculates moments for data elements 102 in each of bins 104. Moments are the averages of the products of various combinations of variables for each data element in the data set. The number of moments calculated for the elements within a single bin depends on the desired degree of Taylor series approximation. Finally, generation process 108 generates a squashed data set 110 and associated weights for each bin. The squashed data set 110 for each bin is constructed having moments approximating those of the elements of the original set of data elements 102 falling in the bin. The individual data elements of squashed data set 110 are referred to herein as representative data elements. Each step can be viewed as an individual module with its own choice of methodology and with its own trade-offs in speed, space, and accuracy.

Figure 7:
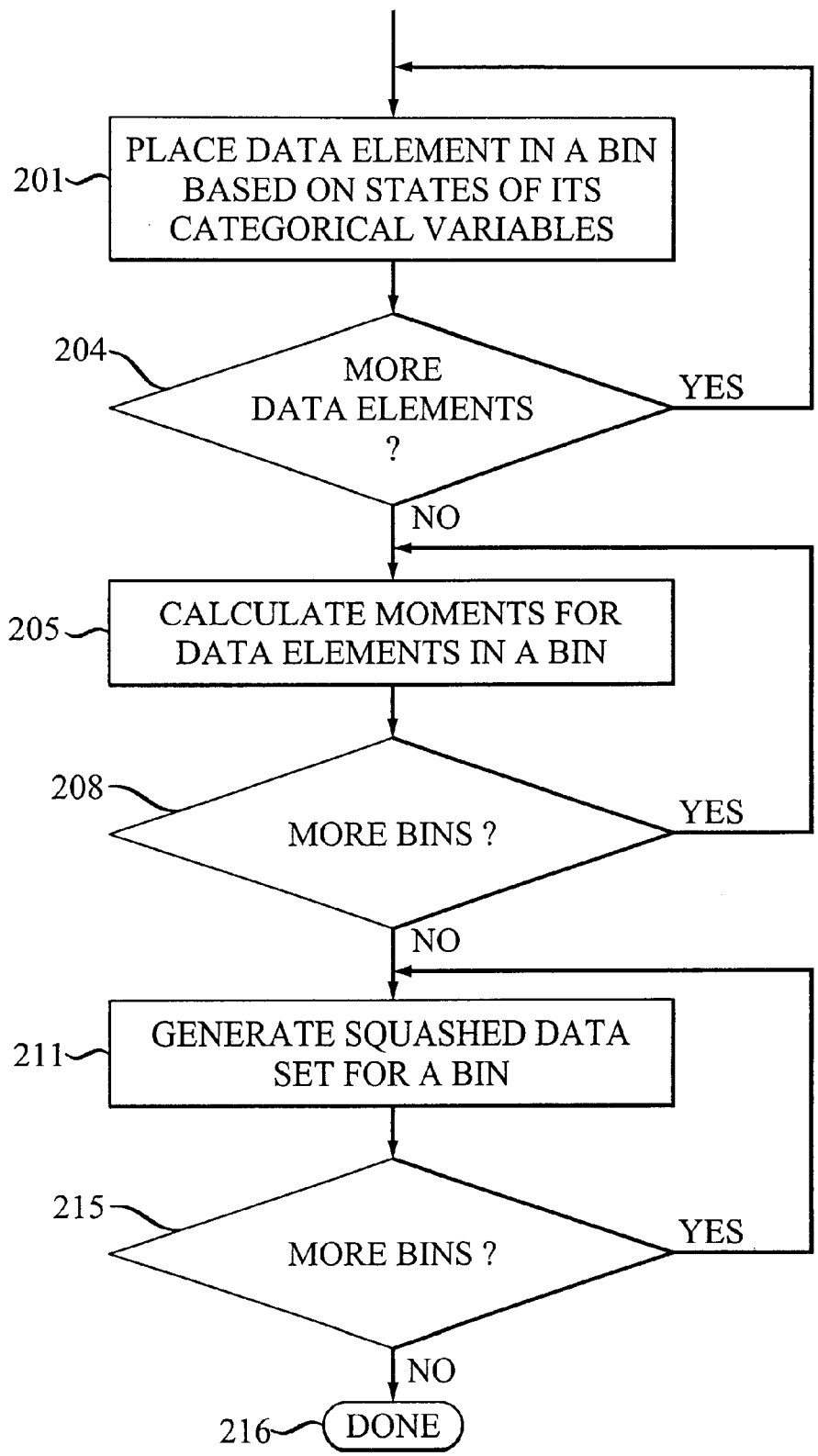

FIG. 7 shows a flowchart corresponding to the block diagram of FIG. 1. In particular, binning process 100 of FIG. 1 is carried out by steps 201 and 204 of the flowchart. Each data element is placed in a bin based on the states of its categorical variables at step 201 and if more data elements are to be placed in bins, as determined at step 204, step 201 is repeated for a next data element until all the data elements have been processed. Moment calculation process 106 of FIG. 1 is carried out by steps 205 and 208 of the flowchart. Moments are calculated for the data elements in a bin at step 205 and if the moments for more bins need to be calculated, as determined at step 208, step 205 is repeated for a next bin until moments for all the bins have been calculated. Generation process 108 of FIG. 1 is carried out by steps 211 and 215 of the flowchart. Based on the calculated moments, a squashed data set is calculated for a bin at step 211 and if squashed data sets for more bins need to be calculated, as determined at step 215, step 211 is repeated for a next bin until squashed data sets have been generated for all the bins, at which point the process ends at 216.

The squashed data set is smaller (by orders of magnitude) than the original data set. It preserves analysis flexibility without sacrificing accuracy due to sampling variability. A restriction on analyzing the squashed data set, compared to the methods available for analyzing the original data set, is that the analysis method or software must be capable of making use of the induced weights.

The requirement that the squashed data set summarize the large data set as accurately as possible means that for all or almost all statistical models that may be fit to the data, the result from a weighted model fit of the squashed data is nearly the same as if the same model was fit to the original data. Random sampling or a cluster analysis can create a type of "squashed" data set. For example, taking a 1% random sample of the data set (e.g., select every 100th row) and then adding a weight variable equal to 100 for every random row selected in the sample creates a smaller data set. However, such procedure creates parameter estimates that typically differ from the corresponding fall data estimates by about 10 standard errors, since standard errors of efficient estimates are inversely proportional to the square root of the sample size. The data squashing procedure described herein can significantly improve the parameter estimates. Another possible strategy for creating a smaller data set is by performing a cluster analysis on the original data set, where each element of the large data set resides in exactly one cluster. The data file could consist of the centers or means of each cluster, and the weight variable would equal the size of the corresponding cluster. However, there are two impediments to this approach. First, clustering algorithms are typically $O(n^2)$ or may require many passes over the data, rendering clustering infeasible for very large data sets. Second, replacing each cluster by a single weighted point at the cluster mean implicitly reduces the overall variance of every quantitative variable in the squashed data set and would thus tend to distort the results of most statistical models.

Data squashing can be seen as a form of lossy database compression. Recent work in database literature has examined methods for the lossy compression of databases and data cubes. However, data squashing has a somewhat different goal. Lossy data cube compression can be judged acceptable if aggregate queries over ranges of the data cube have a small error. Data squashing is acceptable if a different type of query has a small error, e.g., the fitting of statistical models. Therefore, data squashing is valuable for statistical analysis data warehouses.

The data squashing methodology of the present invention may be implemented with hardware and/or software. In one embodiment, the data squashing methodology is implemented as a data processing system, having an application program executing in the memory of a computer. The application program resides on a storage device such as a floppy disk, a CD-ROM, or the hard drive of a computer as computer readable program code.

II. Theoretical Framework For Data Squashing

Referring to FIG. 2, an embodiment assumes a large data set has a simple "flat" structure, consisting of a very large number, N, of data elements, each data element represented by a single row in the data matrix. Each data element consists of a fixed number of variables, each variable represented by a single column in the data matrix. As discussed above, the variables are either categorical or quantitative. Suppose the large data set has columns $A_1, \ldots, A_C, X_1, \ldots, X_Q$, where the A's are categorical variables and the X's are quantitative variables. Let $A=A_{ij}$ and $X=X_{ik}$ denote the original N×C and N×Q data matrices of categorical and quantitative variables, respectively, where $i=1, \ldots, N; j=1, \ldots, C; k=1, \ldots, Q$. Referring to FIG. 3, let $B=B_{ij}$ and $Y=Y_{ik}$ denote the data matrices representing the squashed data set having M<<N rows, where $i=1, \ldots, M; j=1, \ldots, C; k=1, \ldots, Q$. The squashed data set has columns $B_1, \ldots, B_C, Y_1, \ldots, Y_Q$, where the B's are categorical variables and the Y's are quantitative variables, as with the original large data set. Let $w_i$ be the weight assigned to row i of the squashed data set, where $$\sum_{i=1}^{M} w_i = N.$$

Suppose further that a statistical model is being fit to the data. That is, a modeling assumption is made that the large data set is the result of N independent draws from the probability model:

$$f(a_1, \ldots, a_C, x_1, \ldots, x_Q; \theta) = \text{Prob}(A_1=a_1, \ldots, A_C=a_C, X_1=x_1, \ldots, X_Q=x_Q|\theta) \quad (1)$$

where the function $f$ defines the particular model being fit and $\theta$ is a vector of parameters that are estimated from the data. For example if two variables represent a person's age and education level, respectively, $\theta$ could represent the person's income level as estimated from those two variables. A squashed version of the data should provide nearly identical analyses for a wide choice of $f$. "Nearly identical analyses" means that the information about $\theta$ should be approximately the same for the full data set (A, X) as for the squashed data set (B, Y, w). Therefore, the product of probabilities in Equation (1) should represent approximately the same function of $\theta$ for the two possible data sets, or, in statistical terminology, the two samples should have approximately the same likelihood function. Equating the two log-likelihoods, the following requirement results:

$$\sum_{i=1}^{M} w_i \log(f(B_{i1}, \ldots, B_{iC}, Y_{i1}, \ldots, Y_{iQ}; \theta)) = \sum_{i=1}^{N} \log(f(A_{i1}, \ldots, A_{iC}, X_{i1}, \ldots, X_{iQ}; \theta)) \quad (2)$$

Assume that for every set of fixed values of A and $\theta$, $f(A, X, \theta)$ is a relatively smooth function of $(X_1, \ldots, X_Q)$, so that $\log(f(A_1, \ldots, A_C, X_1, \ldots, X_Q; \theta))$ can be well represented by a Taylor series in the neighborhood of any point $x=(x_1, \ldots, x_Q)$. The following approximate equality results:

$$\log(f(A_1, \ldots, A_C, X_1, \ldots, X_Q; \theta)) \cong \sum_{k=1}^{K} g_k \prod_{j=1}^{Q} (X_j - x_j)^{p_{kj}} \quad (3)$$

In Equation (3), there are K terms in the Taylor series. The coefficients $g_k$ depend on $(A_1, \ldots, A_C)$, $\theta$, and x, but not on $(X_1, \ldots, X_Q)$. The power vectors $p_{k1}, \ldots, p_{kQ}$ are all vectors of Q nonnegative integers satisfying $$\sum_{j} p_{kj} \leq d,$$

where d is the degree of the approximation. In order to use Equation (3) to solve Equation (2), partition the space of X into a finite set of regions and partition the space (A, X) into bins where A is constant and X is confined to a single region. Suppose there are R such bins and that the large data set has $N_r$ data elements in bin r, where $$\sum_{r=1}^{R} N_r = N.$$

Likewise, assume that the squashed data set will have $M_r$ representative data elements in bin r, and that the summation $$\sum_{i=1}^{M_r} w_i = N_r.$$

Within the rth bin, the likelihood equivalence of Equation (2) can be separately enforced, which amounts to setting every $B_{ij}$ equal to the corresponding constant value of $A_{ij}$, for $j=1, \ldots, C$, and replacing M and N by $M_r$ and $N_r$, respectively. Therefore, Equation (2) may be rewritten as:

$$\sum_{i=1}^{M_r} w_i \log(f(A_{i1}, \ldots, A_{iC}, Y_{i1}, \ldots, Y_{iQ}; \theta)) = \sum_{i=1}^{N_r} \log(f(A_{i1}, \ldots, A_{iC}, X_{i1}, \ldots, X_{iQ}; \theta)) \quad (4)$$

Combining Equation (3) and Equation (4), the following approximate constraints result:

$$\sum_{i=1}^{M_r} w_i \sum_{k=1}^{K} g_k \prod_{j=1}^{Q} (Y_{ij} - x_j)^{p_{kj}} = \sum_{i=1}^{N_r} \sum_{k=1}^{K} g_k \prod_{j=1}^{Q} (X_{ij} - x_j)^{p_{kj}} \quad (5)$$

$$r = 1, \ldots, R$$

In order for Equation (5) to hold for arbitrary functions $f$, and thus for arbitrary coefficients $g_k$, the factors multiplying each $g_k$ must be equated separately. This leads to the set of equations:

$$\sum_{i=1}^{M_r} w_i \prod_{j=1}^{Q} (Y_{ij} - x_j)^{p_{kj}} = \sum_{i=1}^{N_r} \prod_{j=1}^{Q} (X_{ij} - x_j)^{p_{kj}} \quad (6)$$

$$r = 1, \ldots, R; k = 1, \ldots, K$$

Equation (6) suggests that within each bin (where the categorical variables are constant and the quantitative variables are confined to a compact region) and for each power vector $(p_{k1}, \ldots, p_{kQ})$, the weighted mixed moment of the squashed data set should approximately equal the corresponding mixed moment of the original data set. A moment generally refers to specific statistical information derived from a single variable, whereas a "mixed" moment generally denotes specific information derived from more than one variable. For purposes of this disclosure, "moment" includes any applicable single variable moments in addition to multivariable "mixed" moments. The order of the moments calculated, d, defines the degree of approximation. For second order moments, having d=2, only means, variances and covariances are preserved within each bin. Although this would be sufficient to preserve the results of many linear statistical models such as multiple regression, such a squashed data set may be an inadequate approximation for the nonlinear models often used in data mining applications. Consequently, higher degrees of approximation may be necessary.

In the above discussion, the data sets are arranged with the categorical variables first, followed by the quantitative variables. Such arrangement is not meant as a limitation, but rather, is presented only for purposes of illustration. For example, the categorical variables and quantitative variables could be arranged in any order, or even in separate data matrices.

III. Partitioning The Data Elements Into Bins

As illustrated in FIG. 1, binning process 100 performs a first step of data squashing in the present invention, which entails partitioning the data into compact bins. Binning process 100 partitions the data elements of the large data set 102 into bins 104 of smaller data sets. The partitioning strategy should partition the data elements based on some common characteristic of the data elements. The partitioned data set contains the same set of data elements, although the data elements are reorganized to lie within their respective bins. Let $p_i$ represent the data element $(A_{i1}, \ldots, A_{iC}, X_{i1}, \ldots, X_{iQ})$. FIG. 4 represents a data set containing four bins derived from the original data set of FIG. 2. The first bin contains the data elements $p_1$ to $p_a$, the second bin contains the data elements $p_b$ to $p_c$, the third bin contains the data elements $p_d$ to $p_e$, and the final bin contains the data elements $p_f$ to $p_N$. The data elements may be reorganized within the data set to lie within their respective bins, as shown in FIG. 4. Alternatively, the data elements could be separated into individual data matrices for each bin. However, it is not critical how the data elements are organized, or even that the data elements are reorganized at all, provided there is some way to determine which data elements lie within which bin.

Although many different partitioning strategies are available for creating the bins, three such strategies may be particularly useful, referred to herein as "Categorical" partitioning, "Hyper-Rectangles" partitioning, and "Data-Spheres" partitioning. Categorical partitioning creates bins using only categorical variables. Hyper-Rectangles partitioning and Data-Spheres partitioning create partitions using both categorical and quantitative variables. Deciding which partitioning strategy to use is an important element of data squashing. It will have a profound effect on both the level of data reduction realized and the computational time needed for squashing the data set.

The term "bin" as used herein defines a final subset of data elements grouped together by binning process 100. The term "partition" as used herein defines a subset of data elements that binning process 100 may or may not further divide into additional subsets of data elements. Therefore, "bin" refers only to the final subset of data elements, whereas "partition" may or may not refer to a final subset of data elements.

Categorical partitioning constructs bins using some or all of the categorical variables in the data set. Each possible combination of permissible values of the categorical variables defines a single bin. For example, referring to FIG. 5, if each data element contains two categorical variables ($A_1$ and $A_2$) having three states each, represented by 0, 1 and 2, respectively, Categorical partitioning creates $3^2$ or nine bins. The first bin contains all the data elements where $A_{i1}=0$ and $A_{i2}=0$, the second bin contains all the data elements where $A_{i1}=0$ and $A_{i2}=1$, and so on. In an alternative embodiment, a bin may contain all the data elements where a categorical variable contains a subset of the permissible values. For example, a first bin could contain all the data elements where $A_{i1}=0$ or 1, and $A_{i2}=0$, a second bin could contain all the data elements where $A_{i1}=0$ or 1, and $A_{i2}=1$, and so on. Categorical variables naturally induce partitions. Therefore, Categorical partitioning may be the best approach because it does not introduce any subjective partitions in the data set which do not already exist.

Hyper-Rectangles partitioning first partitions the data elements using some or all of the categorical variables. As with Categorical partitioning, each possible combination of permissible values of the categorical variables defines a single partition. The partitions are further divided by categorizing some or all of the quantitative variables, thereby creating hyper-rectangles in the data space. Categorizing a quantitative variable entails dividing the entire range of permissible values of the variable into individual regions. For example, a quantitative variable having values ranging from 0 to 100 could be categorized by the regions $r_1$, $r_2$, $r_3$ and $r_4$, where $0 \leq r_1 < 25$; $25 \leq r_2 < 50$; $50 \leq r_3 < 75$; and $75 \leq r_4 \leq 100$. There is no requirement that the regions are the same size, or that each quantitative variable is categorized into the same number of regions. Therefore, each partition constructed with the categorical variables is further partitioned into bins. Within each partition, each possible combination of the different regions for each quantitative variable defines a bin, similar to Categorical partitioning.

An efficient choice of bin boundaries is often difficult to specify in advance. With a large number of regions per variable there is a tradeoff—more total bins are created giving more precision, but it results in less data reduction. Since the total number of bins grows exponentially with the number of regions per variable, it is preferable to keep the number of regions for each quantitative variable relatively low. For example, each quantitative variable may be split into 3 regions, based on the 25th and 75th percentiles. For a data set with five quantitative variables, this would create $3^5$ or 243 bins. If there were also two categorical variables having three states each, as in the above example, then there would be a total of $3^2 \times 243$ or 2187 bins. For example, FIG. 6 represents Hyper-Rectangles partitioning of bin 2 of FIG. 5, assuming that Q=3 quantitative variables, whereas each quantitative variable is separated into three regions. The three possible regions for each quantitative variable are represented by $r_1$, $r_2$ and $r_3$, corresponding to the range of values equal to or below the 25th percentile of permissible values, the range of values between the 25th and 75th percentiles, and the range of values equal to or above the 75th percentile, respectively. As shown in FIG. 6, bin 2 from FIG. 5 is subdivided into $3^3$ or 27 bins, referred to in FIG. 6 as bin 2-1, bin 2-2, . . . , bin 2-27. Bin 2-1 contains the elements where $x_{i1}$ is in the lower 25th percentile of permissible values for $x_{i1}$, $x_{i2}$ is in the lower 25th percentile of permissible values for $x_{i2}$, and $x_{i3}$ is in the lower 25th percentile of permissible values for $x_{i3}$, and so on.

Data-Spheres partitioning first partitions the data elements using some or all of the categorical variables. As with Categorical partitioning, each possible combination of permissible values of the categorical variables defines a single partition. The partitions are further divided with one or more levels of partitions by inducing a categorical value on a set of quantitative variables based on the multivariate distribution of those variables. Data-Spheres partitioning may induce a categorical value on a set of quantitative variables in two ways. The resulting partitions are referred to as "layers" or "pyramids", depending on the method of partitioning. Pyramids may be further partitioned into "subpyramids", and so on.

In order to provide a meaningful multivariate distribution between quantitative variables, for each point $p=(x_1, \ldots, x_Q)$, the point is transformed into $p'=(y_1, \ldots, y_Q)$ by subtracting the center of the data set for each variable (for example, the mean) and dividing by the standard deviation. Partitioning into layers requires determining the distance of p' from the origin for every point p' in the data set. The origin is defined as the point $(y_1=0, y_2=0, \ldots, y_Q=0)$. Specifically, the distance of p' from the origin=$\sqrt{y_1^2+y_2^2+\ldots+y_Q^2}$. The data set is then partitioned into layers by the distance of the points from the origin. Optionally, each layer may contain approximately the same number of data elements, i.e., an approximate quantiling algorithm may be used to compute the distance cutoffs.

Any number of the layers may be further partitioned into pyramids, depending on the degree of specificity desired. Informally, a pyramid consists of the set of data elements for which a particular variable of the transformed point has the greatest deviation from the origin, and in a particular direction (positive or negative). In three dimensions, a pyramid has the familiar pyramidal shape. More formally:

$p' \in P_{i+}$ if $|y_i|>|y_j|$, for $y_i>0$; $j=1, \ldots, Q$; $j \neq i$ $p' \in P_{i-}$ if $|y_i|>|y_j|$, for $y_i<0$; $j=1, \ldots, Q$; $j \neq i$ Layers and pyramids are orthogonal partitioning strategies. In combination, they define data sphere partitions. In analogy to data cubes, it is possible to roll up or drill down data sphere partitions. For example, all pyramids may be collapsed in a layer. Or, the pyramids may be further partitioned into subpyramids, creating a hyperpyramid partitioning. For example, $P_{i+j-}$ represents the bin in which $y_i$ has the greatest deviation from the origin and $y_j$ has the second greatest deviation from the origin, for $y_i>0$ and $y_j<0$. In addition, each level of subpyramid may be further subdivided to reach the desired degree of specificity. For example, $P_{i-j-k+}$ represents the bin in which $y_i$ has the greatest deviation from the origin, $y_j$ has the second greatest deviation from the origin, and $y_k$ has the third greatest deviation from the origin, for $y_i<0$, $y_j<0$ and $y_k>0$. In alternative embodiments, the data elements may first be divided into pyramids, and optionally further partitioned into layers.

As an example, assume that three layers are created for the point $p'=(y_1, \ldots, y_Q)$, referred to as an inner, middle and outer layer. The layers may be created so that the inner layer contains 50% of the data elements and the cutoff between the middle and outer layer is twice the distance of the inner layer cutoff. Further assume that the inner layer is not partitioned by pyramids, the middle layer is partitioned by pyramids, and the outer layer is partitioned by pyramids and subpyramids. Such partitioning scheme creates bins encompassing similar proportions of the total data space. The partitioning creates a total of $4Q^2-2Q+1$ bins, although many outer-layer bins may be empty. The inner layer contains only a single bin, because it is not further subdivided. The middle layer contains 2Q bins due to the pyramid partitioning. The bins are referred to as $P_{i+}$ and $P_{i-}$, for $i=1, \ldots, Q$. Specifically the $P_{1+}$ and $P_{1-}$ bins contain the data elements defined by p' where $y_1$'s deviation from the origin is greater than the deviation from the origin of each of the remaining variables $y_2, \ldots, y_Q$, for $y_1>0$ and $y_1<0$, respectively. Similarly, the $P_{2+}$ and $P_{2-}$ bins contain the data elements defined by p' where $y_2$'s deviation from the origin is greater than the deviation from the origin of each of the remaining variables $y_1, y_3, \ldots, y_Q$, for $y_2>0$ and $Y_2<0$, respectively. Finally, the outer layer contains $4Q^2-4Q$ bins due to the subpyramid partitioning. Each of the 2Q partitions created from the initial pyramid partitioning in the outer layer are further subdivided into 2Q-2 bins. For example, the $P_{1+}$ partition is further subdivided into the bins $P_{1+2+}, \ldots, P_{1+Q+}, P_{1+2-}, \ldots, P_{1+Q-}$. Therefore, the outer layer contains $2Q(2Q-2)$ or $4Q^2-4Q$ bins. Consequently, the total number of bins for the three layers is $1+2Q+4Q^2-4Q=4Q^2-2Q+1$.

The Hyper-Rectangles and Data-Spheres partitioning techniques described above assume that the quantitative variables are partitioned within the categorical partitions. However, there is no inherent requirement for categorical partitioning. For example, some data sets may not contain categorical variables. In other situations, some analyses may work better by partitioning the quantitative variables and not the categorical variables, or by first partitioning the quantitative variables and further partitioning the quantitative partitions with categorical partitions. Other partitioning schemes could create partitions based on only some, but not all of the categorical variables. Further partitioning schemes could combine Hyper-Rectangles partitioning and Data-Spheres partitioning. The particular method of partitioning can be modified to take advantage of the memory and processing power available, in addition to the types of analyses to be performed and the format of the data. The three partitioning techniques described above should not be construed as limitations, but rather, as examples of potential partitioning techniques available.

Partitioning separates a set of data elements into different bins, thereby permitting moment calculation process 106 and generation process 108 to work with fewer data elements at a time. In alternative embodiments, however, the entire data set may be squashed as a whole, without partitioning the data elements into bins.

IV. Moment Calculations

The second step of data squashing, performed by moment calculation process 106, is calculating the sufficient statistics that will be used to create representative data elements in the squashed data set. Moment calculation process 106 calculates a set of characteristic values describing relationships between the quantitative variables of each data element. For example, for a data element having quantitative variables $X_1, \ldots, X_Q$, characteristic values may include $X_1, \ldots, X_Q$, $X_1X_2, \ldots, X_1X_Q$, and so on. Moment calculation process 106 then determines a statistical representation of each characteristic value over the data set. In one embodiment, the statistical representations are moments of the quantitative variables for the elements falling in each bin 104. Moments are the averages of the products of various combinations of variables for each data element in the original data set. For example, the second order moments are represented by ($X_iX_j$, $X_i^2$), where:

$$X_iX_j = \frac{1}{n}\sum_{a=1}^{n} X_{ai}X_{aj} \text{ for } i=1,\ldots,Q-1; j=i+1,\ldots,Q$$

$$X_i^2 = \frac{1}{n}\sum_{a=1}^{n} X_{ai}^2 \text{ for } i=1,\ldots,Q$$

How many and which moments to calculate depends on the particular application. Since partitioning reduces the data set into subsets, typically organizing the data elements by some common characteristic, the number of moment calculations required for each bin may be lower than would otherwise be required to approximate the data set as a whole.

In order to provide a good fit for a wide range of machine learning and statistical models, calculating the following moments on the quantitative variables is suggested (note that all of the following variables have been centered and scaled): minima and maxima, means, second order moments ($X_iX_j$, $X_i^2$), third order moments ($X_iX_jX_k$, $X_i^2X_j$, and $X_i^3$), fourth order moments ($X_iX_jX_kX_l$, $X_i^2X_jX_k$, $X_i^2X_j^2$, $X_i^2$, $X_i^3X_j$, and $X_i^4$), and marginal fifth order moments ($X_i^5$). Higher order moments may be calculated, depending on the degree of specificity required. The number of moments that are calculated determines the number of representative data elements fit to each bin. Fewer representative data elements are able to match fewer moments. Therefore, as with the partitioning procedures, the number of moments fit can be adjusted for controlling the amount of data reduction desired, and for reducing the computational complexity, if necessary. In order to match the number of moments to the number of representative data elements, the degree of freedom may be defined as df=m(Q+1), where m is the number of representative data elements in a bin. Note that df is the number of free parameters (values of w and y) that the representative data elements contain. Therefore, K≈df lowest order moments are chosen from among those listed above. The choice of how many moments to fit may be modified to fit with the particular application, and the above example should not be viewed as a restriction.

In one embodiment, the number of representative data elements within the rth bin, $N_r$. The $M_r$, depends on the corresponding number of original data elements within the rth bin, $N_r$. The choice of $M_r$ depends on how much data reduction is desired, and $M_r$ should increase slowly with $N_r$. Although somewhat arbitrary, an example is to use the formula $M_r$=max(1, [α log$_2$ $N_r$]), where α is a number that determines how much data reduction is achieved. As an example, compare α=0, ½, 1, and 2. When α=0, only one representative data element is used to approximate each bin, positioned at the bin mean for each variable. When α>0, the method uses more representative data elements and moments as α increases for a better-fitting squashed data set. The overall data reduction factor is thus approximately $$\sum_r N_r \Big/ \sum_r M_r \approx N/\alpha \sum_r \log_2 N_r.$$

The partitioning procedure may vary with the number of original data elements N to increase the number of bins as N increases, thereby keeping the number of original data elements $N_r$, and the number of representative data elements $M_r$ in each bin relatively constant. In an alternative embodiment, $M_r$ does not increase with $N_r$. For example, $M_r$ may be constant for maintaining a squashed data set having a constant size. $M_r$ may also have a maximum allowable value to take advantage of the processing power available.

In order to compare the three partitioning techniques described above, it may be useful to have a comparable sample size of representative data elements for comparison. Therefore, it may be necessary to fit different sets of moments for each method. As an example, all moments described above may be fit (d=4+) for Categorical partitioning, because it creates the fewest bins. Two moment strategies may be useful with the Hyper-Rectangles partitioning technique, because the number of bins increases very fast with the dimensionality. The complete Hyper-Rectangles strategy fits all first and second moments and marginal third and fourth moments (d=2+). A reduced Hyper-Rectangles strategy, which may be referred to as "Means," fits just the first moments within each Hyper-Rectangles bin (d=1). Data-Spheres partitioning is a middle ground between the above strategies in terms of bins created. Therefore, Data-Spheres partitioning may use up to and including all third order moments (d=3).

The moment calculations have a strong advantage in data mining applications because they can be calculated sequentially. When a new set of data arrives, they can be used to update the moments without recalculating the moments for the whole set. This results because the moments are merely sums of various relationships among the variables of each data element, divided by the total number of data elements. The relevant relationships for the additional data is simply added on to the existing moment calculations, updating $N_r$, the number of original data elements in the corresponding bin. This is important when dealing with millions of records which are streaming in daily, since re-computing moments each time fresh data is received may be undesirable.

In alternative embodiments, statistical information other than or in addition to moments may be determined for generating the squashed data set. Any set of values describing, at least in part, relationships among the variables for each data element may be used. The statistical information of each value over the set of data elements may also be modified. One embodiment simply takes the average of each value over the data set. Another embodiment adds each of set of values together. Another embodiment calculates a weighted average for each value, assigning more weight to more important or more accurate data elements. Other embodiments may calculate more complex statistical information about each value over the set of data elements. In these embodiments, the squashed data set is generated to exhibit substantially similar statistical information as the original data set.

V. Generating Representative Data Elements and Associated Weights

The final step of data squashing, performed by generation process 108, is generating squashed data set 110, defined by the representative data elements and their associated weights. An approximate solution to Equation (6) is sought separately for each bin indexed by r. Within each bin, assume that the $x_j$ in Equation (6) are equal to the mean of the $X_{ij}$ contained in the bin, and, by recentering the X's within each bin to have mean 0, assume that every $X_j$=0. Recentering the X's does not effect the equality of Equation (6), because both sides of the equation are shifted by the same amount. After the representative data elements are generated, the representative data elements are shifted back by the same amount so that they accurately represent the original data set. Therefore, for each bin r, search for an $M_r \times Q$ matrix Y and an $M_r$-length vector w to approximately satisfy the equations:

$$\sum_{i=1}^{M_r} w_i \prod_{j=1}^{Q} Y_{ij}^{P_{kj}} = z_k \quad k = 1, \ldots, K \quad (7)$$

$$\text{where} \quad z_k = \sum_{i=1}^{N_r} \prod_{j=1}^{Q} X_{ij}^{P_{kj}}$$

This is a system of K equations in $M_r(Q+1)$ unknowns. The value of K depends on the number of quantitative variables, Q, and the degree of approximation, d.

For example, first order moments $(X_i)$ lead to Q equations:

$$X_i: \quad \sum_{c=1}^{M_r} w_c Y_{ci} = \sum_{c=1}^{N_r} X_{ci} \quad i = 1, \ldots, Q$$

Second order moments $(X_iX_j, X_i^2)$ lead to Q and $Q(Q-1)/2$ equations, respectively:

$$X_iX_j: \quad \sum_{c=1}^{M_r} w_c Y_{ci} Y_{cj} = \sum_{c=1}^{N_r} X_{ci} X_{cj}$$

$$i = 1, \ldots, Q-1; \quad j = i+1, \ldots, Q$$

$$X_i^2: \quad \sum_{c=1}^{M_r} w_c Y_{ci}^2 = \sum_{c=1}^{N_r} X_{ci}^2 \quad i = 1, \ldots, Q$$

Third order moments $(X_iX_jX_k, X_i^2X_j, X_i^3)$ lead to $Q(Q-1)(Q-2)/6$, $Q(Q-1)$ and Q equations, respectively:

$$X_iX_jX_k: \quad \sum_{c=1}^{M_r} w_c Y_{ci} Y_{cj} Y_{ck} = \sum_{c=1}^{N_r} X_{ci} X_{cj} X_{ck}$$

$$i = 1, \ldots, Q-2; \quad j = i+1, \ldots, Q-1; \quad k = j+1, \ldots, Q$$

$$X_i^2 X_j: \quad \sum_{c=1}^{M_r} w_c Y_{ci}^2 Y_{cj} = \sum_{c=1}^{N_r} X_{ci}^2 X_{cj}$$

$$i = 1, \ldots, Q; \quad j = 1, \ldots, Q; \quad i \neq j$$

$$X_i^3: \quad \sum_{c=1}^{M_r} w_c Y_{ci}^3 = \sum_{c=1}^{N_r} X_{ci}^3 \quad i = 1, \ldots, Q$$

Equations for higher order moments follow in the same manner.

Any available method for solving the system of equations may be utilized. Even if $K \leq M_r(Q+1)$ there may often be no exact solutions to Equation (7), due to enforcement of the constraints:

$$w_i \geq 0; \quad \min_i X_{ij} \leq Y_{ij} \leq \max_i X_{ij} \quad (8)$$

Negative weights and variable values outside the ranges of variables found in the corresponding bin of the original data set are ruled out in order to ensure that the squashed data set is similar to the original data set. However, it is not necessary that the values of Y be restricted to values that occur in the corresponding X For example, if a given $X_j$ is "number of children in the family", and varies from 0 to 10 in the original file, the value 8.5 would be an acceptable value for $Y_j$, but not 10.5 or -1. If it is desired to maintain the set of actually occurring values, then the variable is made categorical (a column of A). Although the constraints help assure that the squashed data set is similar to the original data set, particular applications may eliminate some or all of the constraints, or add additional constraints.

The search for (Y, w) is treated as the search for a least squares estimate to minimize:

$$S(Y, w) = \sum_{k=1}^{K} u_k \left( z_k - \sum_{i=1}^{M_r} w_i \prod_{j=1}^{Q} Y_{ij}^{P_{kj}} \right)^2 \quad (9)$$

In Equation (9), the positive multipliers $u_k$ are used to ensure that the lower-order moments are approximated more accurately. Since it is trivial to scale w and each column of Y so that the moments of order 0 and 1, and the pure squares of order, are fit exactly, the corresponding values of k have $u_k=1000$. All the other $u_k$ sum to 1, with moments of order 2 getting twice the value as moments of order 3, which are in turn twice as large as the $u_k$ for moments of order higher than 3. In addition to being centered at 0, the X's are originally scaled to have variance 1, so that moments of different orders are comparable. The above values for $u_k$ are somewhat arbitrary and are provided only as an example. Alternative embodiments may have different values for $u_k$, or even eliminate $u_k$ altogether. Computation of the moments $u_k$ is performed with an updating algorithm, so that the centered and scaled moments within each bin can be computed in a single pass over the large data set with a minimum of round-off error. As initial values in an iterative search, each $w_i$ is set equal to $N_r/M_r$, and the $Y_{ij}$ are drawn independently from a uniform distribution within their allowed ranges. Since S(Y, w) in Equation (9) is a simple polynomial function of the unknowns, it is easy to compute the required derivatives for a second-order Newton-Raphson iterative scheme. The Newton-Raphson scheme is a well-known iterative method for generating a sequence of approximations of a solution for a given equation. In an alternative embodiment, the initial values for the $Y_{ij}$ are selected using a random sample of the $X_{ij}$'s. Other alternative embodiments may take advantage of other initial values.

Two methods may hasten convergence. First, rather than update all $M_r(Q+1)$ unknowns at each Newton-Raphson step, which would involve computing and working with a $K \times M_r(Q+1)$ Hessian matrix of derivatives of $$\sum_{i=1}^{M_r} w_i \prod_{j=1}^{Q} Y_{ij}^{P_{kj}},$$

it works well to merely update a single column of Y at a time, cycling through the columns. This requires working with only $M_r$ unknowns at a time and the derivatives of the moments involving only one variable with respect to these unknowns, leading to a Hessian matrix of size $k' \times M_r$, where $k' < K$ is the number of moments involving that variable. These iterations do not update the values of w. However, it is also easy to work with a single row of Y and the corresponding element of w, to update only (Q+1) unknowns at a time. In this case, the Hessian matrix is of size $K \times (Q+1)$. These partial updates allow efficient search for a minimum of Equation (9).

The second method is maintaining the constraints of Equation (8) at each update step. This is done by transforming the unknowns using a logistic transform, so that the finite range is converted to an unbounded range and out-of-bound updates are prevented. In addition, at each update the step size may be reduced if necessary to ensure that Equation (9) gets smaller at each update. There will rarely be a unique local minimum of Equation (9). However, the multiple local minima often have very similar values of S(Y, w), and will serve equally well for the purpose of creating a squashed data set. The Newton-Raphson search can be repeated with different random starting points to help assure accurate results.

VI. Computational Complexity of Data Squashing

Data squashing as described herein scales well with the number of rows in the data set, and moderately well with the number of variables. The computational burden should be separately broken down into sources due to binning process 100, moment calculation process 106, and generation process 108. Suppose there are B partitions due to categorical variables, and Q quantitative variables, with N data elements in the large data set. For purposes of determining computational complexity, assume that the data set has been pre-sorted according to the categorical partitions. The overhead for this sorting step, roughly N log(N) operations is part of every version of squashing described above. The squashing is done independently within each bin, assuming that a single bin has n data elements. Therefore, the squashing in each bin may be parallelized.

A. Cost Of Partitioning

Categorical partitioning introduces no additional cost associated with partitioning because there is no partitioning using the quantitative variables.

Hyper-Rectangles partitioning requires only a single pass over the data, because determining the bin boundaries depends only on computing the approximate quartiles of each quantitative variable, using the partitioning technique of the earlier example. The memory requirements are proportional to Q and the CPU cost is proportional to nQ. The cost of the Means strategy is the same as regular Hyper-Rectangles partitioning because the grouping is the same.

Data-Spheres partitioning requires two passes over the data to determine the data sphere bin boundaries and assign each data element to one of the $4Q^2-2Q+1$ bins, using the partitioning technique of the earlier example. The memory requirements are proportional to Q and the CPU cost is proportional to nQ.

B. Cost of Computing Moments

The number of moments that must be calculated depends on the number of quantitative variables Q for each data element. There are Q first order moments ($X_i$), one for each quantitative variable. The second order moments are ($X_i^2$, $X_iX_j$). ($X_i^2$) requires Q calculations, and ($X_iX_j$) requires $Q(Q-1)/2$ calculations. The third order moments are ($X_iX_jX_k$, $X_i^2X_j$, $X_i^3$). ($X_iX_jX_k$) requires $Q(Q-1)(Q-2)/6$ calculations, ($X_i^2X_j$) requires $Q(Q-1)$ calculations, and ($X_i^3$) requires Q calculations. The fourth order moments are ($X_iX_jX_kX_l$, $X_i^2X_jX_k$, $X_i^2X_j^2$, $X_i^3X_j$, $X_i^4$). ($X_iX_jX_kX_l$) requires $Q(Q-1)(Q-2)(Q-3)/24$ calculations, ($X_i^2X_jX_k$) requires $Q(Q-1)(Q-2)/2$ calculations, ($X_i^2X_j^2$) requires $Q(Q-1)/2$ calculations, ($X_i^3X_j$) requires $Q(Q-1)$ calculations, and ($X_i^4$) requires Q calculations. The marginal fifth order moments are ($X_i^5$), requiring Q calculations.

Following the earlier suggestion, Categorical partitioning computes all moments up to order 4 and the marginal moments of order 5. There are $K_c=5Q+3Q(Q-1)+2Q(Q-1)(Q-2)/3+Q(Q-1)(Q-2)(Q-3)/24$ total moments to compute. $K_c$ is asymptotically equivalent to $Q^4/24$, but for moderate Q the lower-order terms in the expression for $K_c$ predominate. All moments can be computed in a single pass over the data set. Therefore, memory requirements are proportional to $K_c$ and the CPU cost is proportional to $nK_c$.

Following the earlier suggestion, Hyper-Rectangles partitioning computes first order and second order moments, and marginal third order forth order moments. There are $K_h=Q(Q+7)/2$ moments to compute within each bin. Let H be the number of populated hyperrectangles, with $H \leq 3^Q$, assuming that each quantitative variable is split into three regions as described earlier. Alternatively, if each quantitative variable was split into L regions, then $H \leq L^Q$. In practice, H will often be much smaller than this worst-case bound, and the ability of the Hyper-Rectangles method to scale up to large values of Q depends on how fast H grows as more variables are included. Using a one-pass algorithm, the memory requirements will be $K_hH$ with the CPU cost proportional to $nK_h$. If the data are first sorted into the H quantitative partitions [costing proportional to n(Q+log(n)) in CPU], then only $K_h$ units of memory are needed to cumulate the moments for each bin sequentially. Computing the means pursuant to the Means strategy requires memory proportional to QH and CPU cost proportional to nQ.

Data-Spheres partitioning computes all moments up to order 3. There are $K_d=3Q+3Q(Q-1)/2+Q(Q-1)(Q-2)/6$ moments to compute. $K_d$ is asymptotically equivalent to $Q^3/6$, but for moderate Q the lower-order terms in the expression for $K_d$ predominate. Let D be the number of populated data sphere bins. In the Data-Spheres partitioning example described earlier, in which three layers are created with the middle layer partitioned by pyramids and the outer layer partitioned by pyramids and subpyramids, then $D \leq 4Q^2-2Q+1$. Using a one-pass algorithm, the memory requirements would be $K_dD$, with the CPU cost proportional to $nK_d$.

C. Cost of Computing Representative Data Elements

If there are K moments per bin and M representative data elements to estimate, the task is to estimate M(Q+1) unknowns as the least squares solution to K equations. Within a categorical partition, the task must be repeated D or H times for the Data Sphere and Hyper-Rectangles methods, respectively. There is no dependence on n, the number of data elements in the original data set that fall in the categorical partition, except that as n increases the value of D or H may increase toward their respective bounds of $4Q^2-2Q+1$ and $3^Q$. Also, if the number of data elements in any quantitative partition falls as low as M, there is a trivial solution to the equations found by equating the representative data elements to the original data elements.

The CPU cost of converging to an iterative solution is impossible to specify in advance and depends on the particular estimation algorithm and the data. As discussed earlier, one iteration of the above-mentioned algorithm involves Q steps that construct and process a k'×M Hessian matrix plus M other steps that construct and process a K×(Q+1) Hessian matrix. This involves $O(M^2K+M^3+Q^2K+Q^3)$ arithmetic operations and O(MK+QK) memory units. Typically, performing about 100 such iterations for each solution provides satisfactory results.

For example, for Categorical partitioning choose M=50, and employ a general strategy of M proportional to $Q^2$. This results in $O(Q^4K_c+Q^6+Q^2K_c+Q^3)=O(Q^8)$ arithmetic operations since $K_c=O(Q^4)$. The required memory is $O(Q^2K_c+QK_c)=O(Q^6)$. For Hyper-Rectangles partitioning, choose M=6, and employ a general strategy of M=Q+1. The estimation has to be repeated across $H=O(3^Q)$ bins for each categorical partition. This results in $O(HQ^2K_h+HQ^3)=O(3^QQ^4)$ arithmetic operations since $K_h=O(Q^2)$. The required memory is $O(QK_h+QK_h)=O(Q^3)$. The Means strategy introduces no further cost of computing representative data elements after computing the moments. For Data-Spheres partitioning, choose M=10, and employ a general strategy of M=2Q. The estimation has to be repeated across $D=O(Q^2)$ bins for each categorical partition. This results in $O(DQ^2K_d+DQ^3)=O(Q^7)$ arithmetic operations since $K_d=O(Q^3)$. The required memory is $O(QK_d+QK_d)=O(Q^4)$.

D. Cost Summary

With respect to memory, all the methods and steps of the squashing technology, with the possible exception of generation process 108 when used with Categorical partitioning, are extremely economical and scale very well in both N and Q. With respect to arithmetic operations, binning process 100 and moment calculation process 106 involve an effort no more onerous than sorting and a very few passes over the data set. Generation process 108 is much more computationally intensive, but has the tremendous advantages that it is hardly affected by the size of N and can make efficient use of parallel processing.

Particular embodiments of the invention may feature one or more of the following advantages. Data squashing generates a representative data set emulating the multivariate distribution of a larger data set more accurately than random sampling. As opposed to random sampling, data squashing may be tuned to the intended analysis. Random sampling may also create problems when confidentiality is a concern, as with customer or patient records. A squashed data set, however, contains only a representation of the aggregate behavior of the large data set, not individual records themselves. Each modular piece of the data squashing procedure may be individually tuned and improved.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternative embodiments may not have been presented for a specific portion of the invention, or that further alternative embodiments may be available for only a portion of the above-described embodiments, is not to be considered a disclaimer of those alternative embodiments. One of ordinary skill will appreciate that many alternative embodiments that have not been specifically enumerated are within the literal scope of the following claims, and that others are equivalent.

What is claimed is:

1. A method of squashing an original data set into a representative data set, said original data set and said representative data set each comprising a plurality of data elements, each of said data elements comprising a plurality of variables, the method comprising:

computing for each data element of said original data set a first set of characteristic values, at least ones of the characteristic values of said first set being a function of two or more variables in said each data element;

computing a statistical representation of each of the first set of characteristic values over said set of original data elements; and generating said set of representative data elements in such a way that a statistical representation of each of a second set of characteristic values over the set of representative data elements is substantially similar to the statistical representation computed for the first set of characteristic values.

2. The method of claim 1, further comprising:

assigning said original data elements to groups prior to computing the statistical representation, the data elements of each group having at least one common characteristic.

3. The method of claim 2 wherein the common characteristic is the value of a categorical variable.

4. The method of claim 2 wherein the common characteristic is a range of values of a quantitative variable.

5. The method of claim 4, wherein:

the common characteristic further includes the value of a categorical variable.

6. The method of claim 2 where the common characteristic includes the value of a statistical characteristic of a plurality of quantitative variables.

7. The method of claim 6, wherein:

the plurality of quantitative variables are standardized by subtracting the mean value from each of the plurality of quantitative variables and dividing by the standard deviation.

8. The method of claim 7, wherein:

the statistical characteristic is a range of distances between a point of origin and a point defined by the standardized quantitative variables.

9. The method of claim 7, wherein:

the statistical characteristic is the value of a standardized quantitative variable relative to the value of each of the remaining standardize quantitative variables.

10. The method of claim 9, wherein:

a further common characteristic is a range of distances between a point of origin and a point defined by the standardized quantitative variables.

11. The method of claim 6, wherein:

the common characteristic further includes the value of a categorical variable.

12. The method of claim 6, wherein:

the common characteristic further includes a range of values of a quantitative variable.

13. The method of claim 1, wherein:

the statistical representation of at least ones of the first set of characteristic values includes an average value.

14. The method of claim 1, wherein:

the statistical representation of at least ones of the first set of characteristic values includes a weighted average value, having more weight assigned to more important or more accurate data elements.

15. The method of claim 1, wherein:

the statistical representation of at least ones of the first set of characteristic values is a function of the sum of the characteristic values of each data element in the set of original data elements.

16. The method of claim 1, wherein:

the statistical representation of at least ones of the first set of characteristic values includes a moment of the set of original data elements.

17. The method of claim 1, further comprising:

updating the statistical representation of each of the first set of characteristic values when a new data element is received.

18. The method of claim 1, further wherein:

the set of representative data elements contains fewer data elements than the set of original data elements.

19. The method of claim 1, further comprising:

generating a weight associated with each representative data element.

20. The method of claim 19, wherein:

the sum of the weights of every representative data element equals the number of original data elements.

21. The method of claim 19, wherein:

the statistical representation of each of the second set of characteristic values includes a weighted moment.

22. The method of claim 1, further comprising:

generating a set of representative data elements includes correlating a Taylor series approximation of the set of original data elements to a Taylor series approximation of the set of representative data elements.

23. The method of claim 22, wherein:

correlating includes using a Newton-Raphson iterative scheme.

24. A method of squashing an original data set comprising original data elements into a representative data set comprising representative data elements, the method comprising:

assigning the original data elements into groups based on the value of at least one variable in each of the original data elements;

computing, for each group, a selected number of moments of the data elements assigned to that group; and generating representative weighted data elements having substantially similar moments to the moments of the original data elements.

25. The method of claim 24, wherein:

the representative data set contains fewer data elements than the original data set.

26. The method of claim 24, wherein:

the assigning uses Categorical partitioning.

27. The method of claim 24, wherein:

the assigning uses Hyper-Rectangles partitioning.

28. The method of claim 24, wherein:

the assigning uses Data-Spheres partitioning.

29. A data processing system, comprising:

memory for storing statistical information about a set of original data elements, the original data elements comprising a plurality of variables; and a computer usable medium having computer readable program code means embodied in said medium for generating a plurality of representative data elements having the same plurality of variables and a weight variable, the number of representative data elements being less than the number of original data elements, wherein statistical information about the weighted representative data elements is substantially similar to the statistical information about the set of original data elements.

30. The data processing system of claim 29, wherein:

the statistical information includes a moment of the data elements.

31. The data processing system of claim 30, wherein:

the statistical information includes moments of varying order.

32. A computer program product for squashing an original data set into a representative data set, said original data set and said representative data get each comprising a plurality of data elements, each of said data elements comprising a plurality of variables, the computer program product comprising:

a storage device containing computer readable program code, the program code comprising:

program code for computing for each data element of said original data set a first set of characteristic values, at least ones of the characteristic values of said first set being a function of two or more variables in said each data element;

program code for computing a statistical representation of each of the first set of characteristic values over said set of original data elements; and program code for generating said set of representative data elements in such a way that a statistical representation of each of a second set of characteristic values over the set of representative data elements is substantially similar to the statistical representation computed for the first set of characteristic values.

\* \* \* \* \*